United States Patent [19]
Fullwood

[11] Patent Number: 4,837,638
[45] Date of Patent: Jun. 6, 1989

[54] VIDEO TAPE EDITING SYSTEM WITH VERTICAL INTERVAL TIME CODE

[76] Inventor: John W. Fullwood, 17 Chittenden Ave., New York, N.Y. 10033

[21] Appl. No.: 83,033

[22] Filed: Aug. 6, 1987

[51] Int. Cl.⁴ .................... H04N 7/087; H04N 5/93; G11B 27/02
[52] U.S. Cl. .................................. 360/14.2; 358/311; 360/14.3
[58] Field of Search ................ 360/14.1, 14.2, 14.3, 360/13, 33.1, 10.3; 358/311, 312, 320, 323, 335, 337, 339, 147

[56] References Cited

U.S. PATENT DOCUMENTS

| | | | |
|---|---|---|---|
| 3,604,858 | 9/1971 | Doi | 360/14.1 X |
| 4,134,130 | 1/1979 | Tachi | 358/147 |
| 4,163,262 | 7/1979 | Kaemmerer | 360/72.2 |
| 4,167,759 | 9/1979 | Tachi | 358/147 |
| 4,316,224 | 2/1982 | Hansen et al. | 360/72.2 |
| 4,507,688 | 3/1985 | Fujiki et al. | 360/13 |

OTHER PUBLICATIONS

Hickman et al–"Time Code Handbook", Datametrics–Dresser Industries, Inc., Wilmington, Mass. ©1982; pp. 1–9, 41–43, 80–88.
Society of Motion Picture and Television Engineers, Inc. Journal Feb. 1984–"An Intelligent Time-Code Peripheral for Computer-Based Videotape Editing System" by Michael Racelo.

Primary Examiner—Marvin L. Nussbaum
Attorney, Agent, or Firm—Brumbaugh, Graves, Donohue & Raymond

[57] ABSTRACT

A video editing system which utilizes the vertical interval time code address as the sole edit control code in performing a video edit, whereby a time code of the edit point is read from the record videotape and is supplied to an inserting circuit which inserts the code into the vertical blanking period of the video edit signal. Reading and editing are performed by utilizing a modified recorder having a pre-erase video head or a modified reader which supplies a time code to the generator during pre-roll time only, or a modified generator having means to latch a pre-set time code prior to recording. In an alternative embodiment, a system is disclosed which utilizes a small track of a videotape separate from the track containing the main video signal, the smaller track having a segment of the vetical blanking period which contains the time code address recorded thereon. A second language translation is also disclosed as being part of any of the embodiments since the need for a dedicated longitudinal track for recordation of time code addresses is eliminated.

18 Claims, 17 Drawing Sheets

VIDEO TAPE EDITING SYSTEM WITH VERTICAL INTERVAL TIME CODE

BACKGROUND OF THE INVENTION

This invention relates to a novel video editing system employing the Vertical Interval Time Code (VITC) as the sole edit control code in the video tape editing process.

Computer based videotape editing systems have significantly increased the speed, convenience and quality of the video and audio editing process. The basic operating parameter of any computer-based editing system is the ability to assign each and every frame of video information a unique address. This address, termed a time-code, is then used as the identifier of any particular piece of video information to be edited. The American National Standard for the time-code signal format is the Society of Motion Picture and Television Engineer's (SMPTE) time-code signal. The SMPTE time-code signal is encoded on the record medium on a separate track from those which contain the video information. It is recorded along a longitudinal track which is usually read or written to by a stationary, dedicated head in the operating apparatus. For this reason, the SMPTE time-code has become known in the art as the longitudinal time-code or LTC. The LTC wave-form is shown in FIG. 1.

Many devices capable of reading the LTC and performing edits based on manipulation of the LTC, are known in the art. However, editing systems utilizing the LTC as the edit control code exhibit deficiencies when the record medium, e.g., videotape, is transported at very slow speeds or stopped. Video editing becomes very difficult during slow motion or still frame editing due to the fact that the LTC is recorded on a separate longitudinal track which must be moving above some minimal speed in order for a sufficient voltage to be induced at the coil of the head reading the LTC. It is an advantage to the editing process to be able to choose individual frames presented in slow motion or still frame manner, yet the inability to read the LTC proves to be a major deficiency to any such editing system in that the addresses of the frames are not available when they are viewed or edited in such a manner.

It has, therefore, been suggested in the art, as in U.S. Pat. No. 4,167,759, to create a time-code edit signal that is recorded as part of the video information on the same track as the video signal, thereby allowing the code to be read in slow motion or still frame modes in the same manner as the video signal. This edit code is referred to as a Vertical Interval Time Code (VITC) because the edit signal is inserted into two non-adjacent lines during the vertical blanking period, in order to insure that it is not presented on the screen of the viewing apparatus; line 21 generally being the first line visible on a receiver in a standard 525 line/60 field television system.

U.S. Pat. No. 4,167,759 created a VITC edit signal by reading the LTC from the longitudinal track, compressing it, and inserting it into the vertical blanking period, specifically at lines 10-21 of the vertical interval. With reference to FIG. 2, the VTR records a video signal through input terminal 20 and records the longitudinal time code on the dedicated LTC track at terminal 21. The LTC output is provided at terminal 23.

During a video edit, the video signal to be inserted is applied to the VITC inserting circuit 24. The LTC reader 27 reads the LTC address recorded on the tape of the record VTR, and provides the output to the LTC generator 25 as a pre-set signal through switch 14 so as to forward that LTC address to the VITC inserting circuit 24. The LTC address is thereby converted to VITC format and inserted into the video signal at terminal 20. Since one frame is required to read the LTC code by LTC reader 27, the LTC generator adds one to the address before conversion to VITC, thereby insuring continuity of the addresses in the edited tape. Alternatively, the VITC generator converts the forwarded address from the LTC generator and the video signal is then passed to VITC reader 26 through switch 15, which reads the VITC code and then increments it and supplies it back to VITC inserting circuit 24. A circuit for the compression and insertion of the LTC is shown in U.S. Pat. No. 4,134,130.

This version of the VITC edit code has not, however, been widely accepted in the art.

It has, therefore, been suggested by the SMPTE to provide a different version of the VITC edit signal which is not based on a compression of the LTC timecode, but rather has its own unique bit stream, as shown in FIG. 3. This version of VITC is the current specification for the waveform.

Various devices now exist which conform to this VITC edit code. For example, there are devices that can read or generate the VITC bit stream, while other devices have the capability of converting LTC to VITC or vice versa. While VITC readers and generators have found some useful enterprise, the LTC to VITC converters remain the dominant VITC-based hardware. This is so because LTC is still almost exclusively used as the edit control signal throughout the industry. The basic elements of a video editing system, i.e., the video tape recorders, signal generators and edit controllers, are manufactured for an LTC based system.

There exists, therefore, a need for a defined video tape editing system that implements the VITC edit signal as the sole edit control code. While the basic wave-form implementation has been known there exists a need for an editing system wherein the necessary, structured cooperation between the VTR's, the time code readers and generators, and the edit controllers is set forth in detail.

SUMMARY OF THE INVENTION

The present invention takes advantage of the VITC edit signal and provides an editing system which utilizes the VITC edit signal as the sole edit control code in the editing process. The need for LTC is thereby eliminated. In accordance with the present invention elements of a VITC-based video editing system are specified. A method of performing a video edit utilizing only the VITC edit code signal is disclosed, as well as the necessary modifications to the reader, generator, controller and video tape recorder components for implementing the disclosed method.

According to the method disclosed herein, a feedback-loop type system is employed to capture and manipulate the pre-recorded VITC edit signal before the inserted video is recorded onto the record VTR.

A selected number of segments are chosen as a video edit from a first video signal and are supplied to a VITC inserting circuit which receives a time code input of the insertion point from the record videotape before the selected number of segments are recorded thereon. An intelligent edit controller remotely controls the recording and inserting procedures. The inserting circuit then inserts the time code address of the record videotape into the vertical blanking period of the video edit signal.

While the method is applicable to any editing system, modifications and solutions are suggested for three-quarter inch E-format broadcast systems and one inch C-format systems, these being the most widely used formats. The ¾ inch solution is achieved by any one of three possible hardware implementations: (1) modification of the VITC reader, (2) modification of the VITC generator, or (3) modification of the video tape recorder.

The VITC reader solution is directed at a modified VITC reader which reads a time code from the record videotape during pre-roll and applies this code to a jam sync input of a VITC generator through switching means which is under control of the edit controller, only during pre-roll. The VITC generator solution discloses a modified VITC generator which has memory means and a remote start/stop control line such that the time code of the edit point of the record tape may be preset into the memory of the generator which, upon command from the edit controller, inserts the preset time code into the first of the vertical blanking periods of the edit signal and thereafter increments the address and inserts them respectively into each successive vertical blanking period of the selected number of segments. The VTR solution discloses adding a pre-erase video head which reads the time code of the record tape and constantly supplies it to the jam sync input of the VITC generator. Alternatively, the confidence playback or auto scan tracking head may be biased in such a manner that it is made to read the video signal before it is erased and time code is re-recorded along with the edited video.

The 1-inch solutions are achieved by utilizing a complex switching network for manipulating the VITC edit code. In an alternative embodiment it is also shown that a feedback arrangement is not needed for the 1-inch solution.

Since a one-inch tape contains a ten-line segment of the vertical blanking period on a small, separate track from the main video signal, a sync head can be used to read the time code from this track if it is constrained to this ten-line period. The scanner element in this embodiment employs scanner plates having cut-outs thereon and optical transmission and receiving mean on respective sides thereof for accomplishing the switch-over from video head to sync head during the scanning process. Further switching means are included which enable the VTR to record the video edit signal while simultaneously reading the sync track containing the time code address.

Finally, it is shown that by eliminating the need for LTC, the track that was dedicated to recording the LTC, i.e., the longitudinal audio track, may now be utilized to include a second language translation of the video signal.

For a better understanding of the invention, as well as other objects and further features thereof, reference is had to the following detailed description of the preferred embodiments which makes reference to the following set of drawings.

BRIEF DESCRIPTION OF THE DRAWINGS

FIGS. 6(a)-(d) are diagrams of various tape paths across an auto scan tracking (AST) video head;

DETAILED DESCRIPTION OF THE PREFERRED EMBODIMENTS

Figure 1:
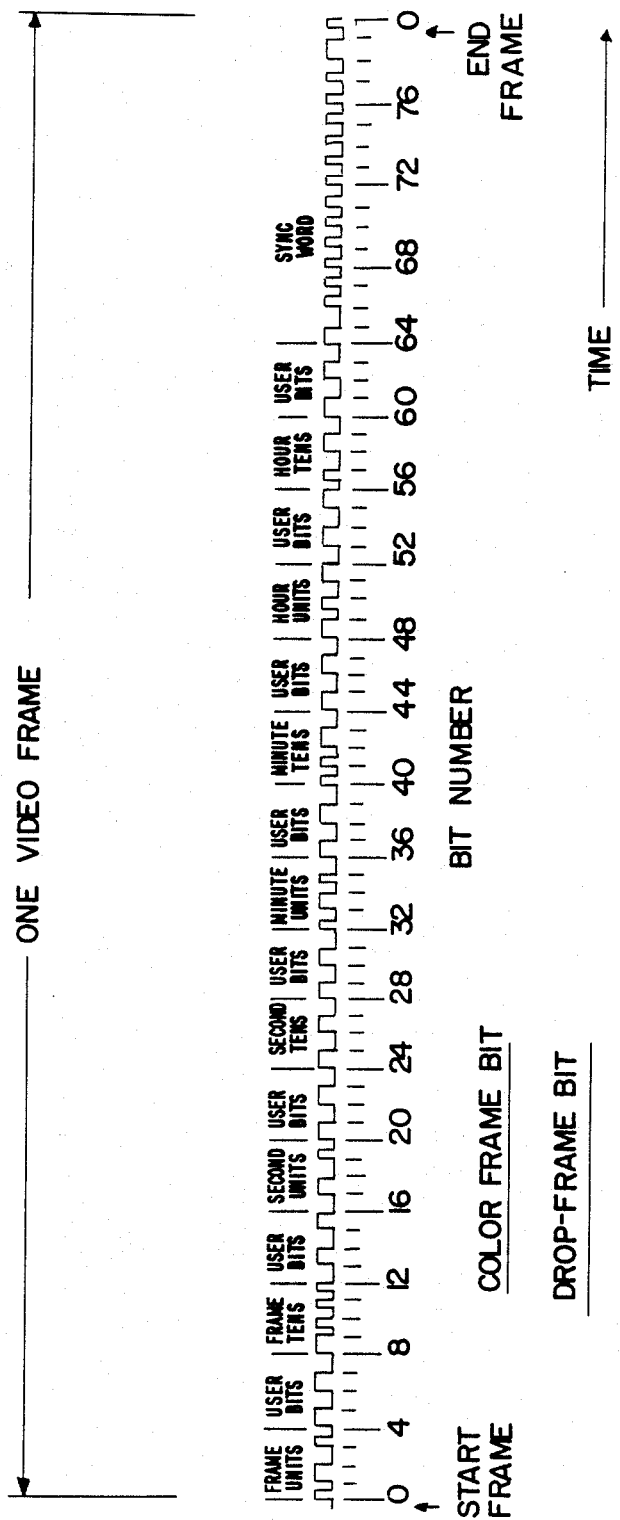
FIG. 1 is a drawing of the longitudinal time code waveform.
Figure 2:
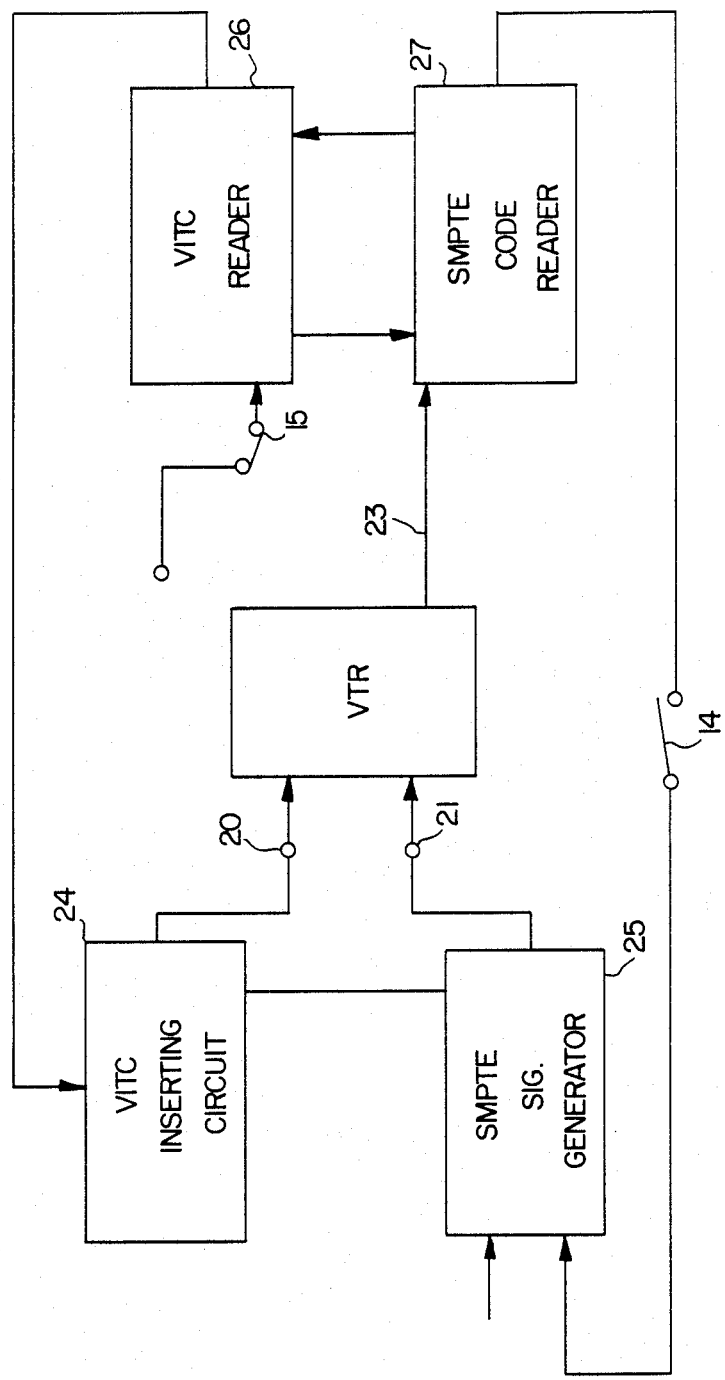
FIG. 2 is a block diagram of an editing system in accordance with the prior art.
Figure 3:
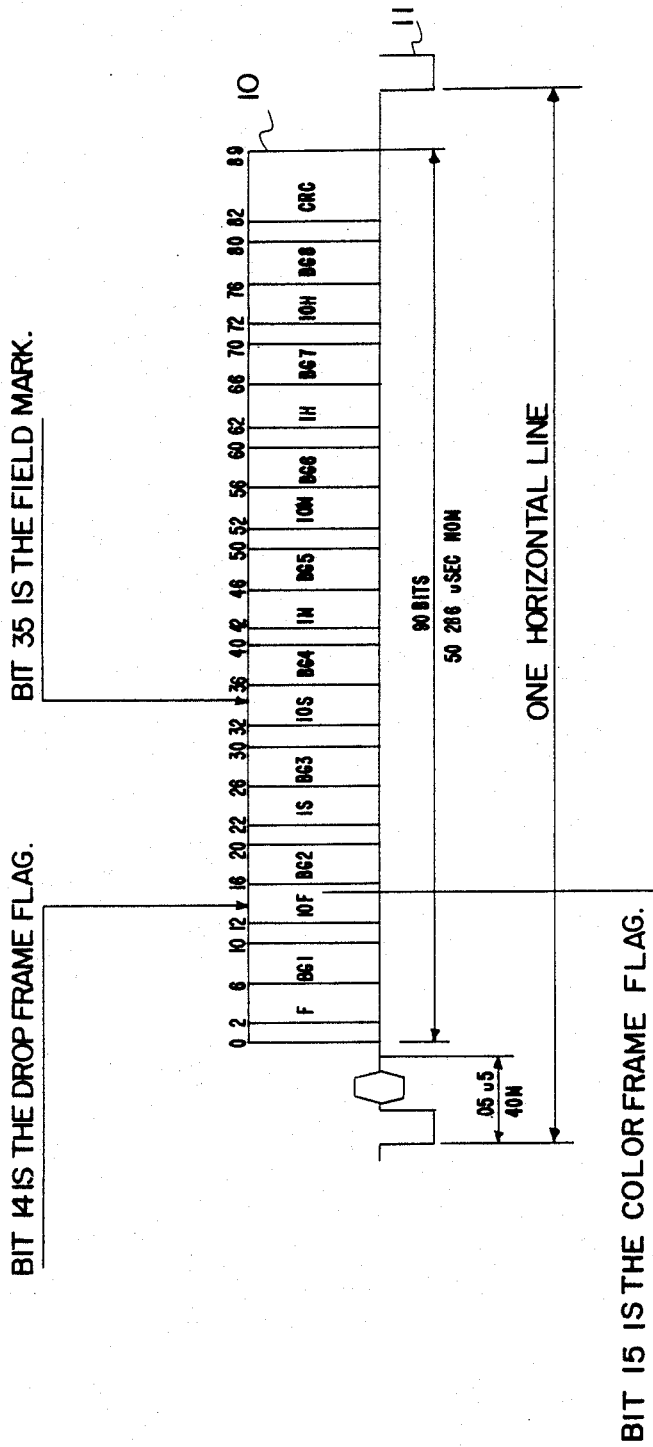
FIG. 3 is a drawing of the current vertical internal time code waveform specification.
Figure 4:
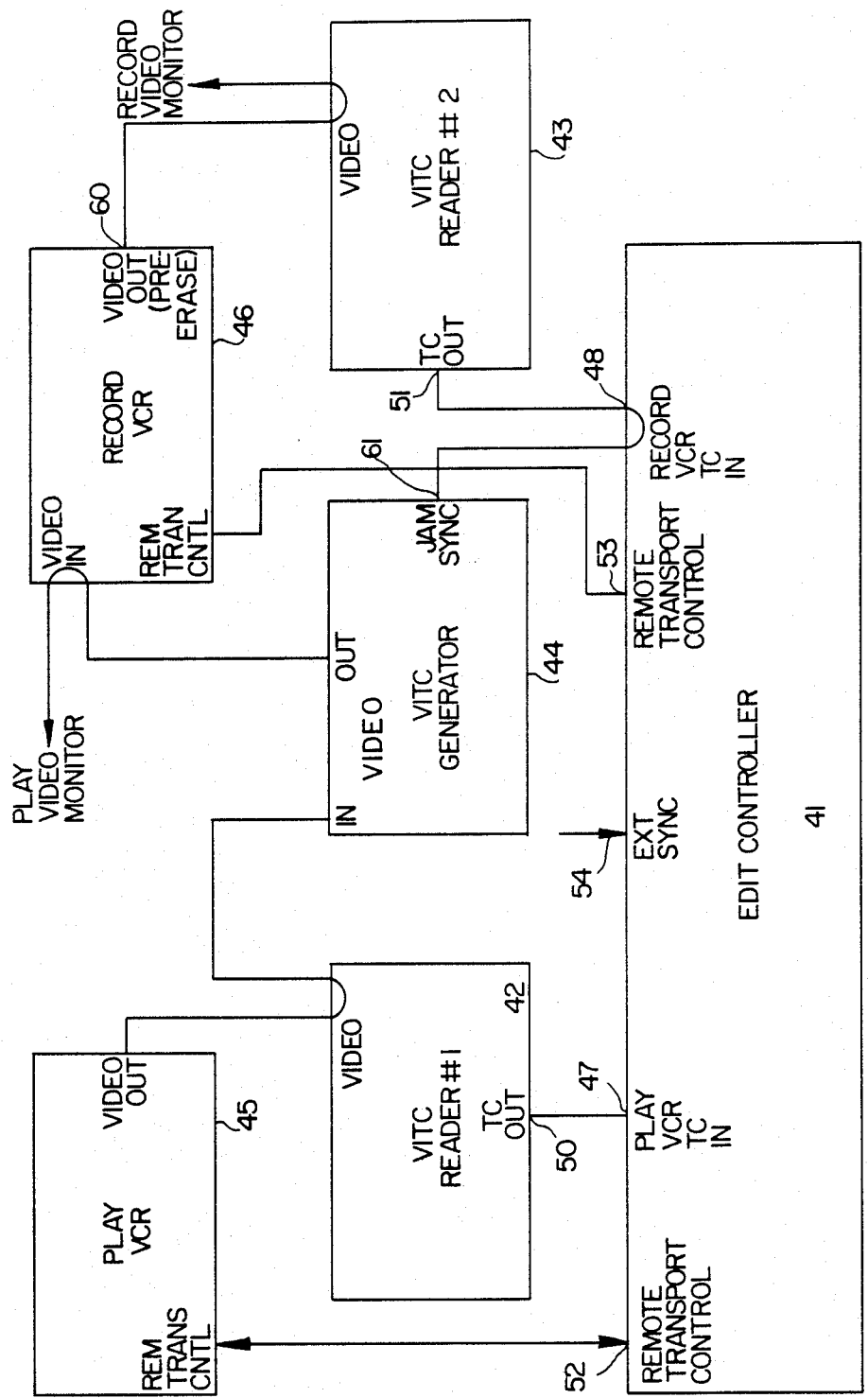
FIG. 4 is a block diagram of an editing system in accordance with the present invention.

With reference to FIG. 4, there is shown a block diagram of an editing system in accordance with the present invention, which implements a modified video tape recorder for manipulation of the VITC edit code signal.

The editing system includes an edit controller 41, VITC readers 42, and 43, VITC generator 44, play VTR 45 and record VTR 46. As can be seen, edit controller 41 has its play and record VTR time-code input terminals 47 and 48 connected to the time-code output terminals 50, 51 of VITC readers 42 and 43, respectively. Similarly, the respective remote transport control lines 52 and 53 of edit controller 41 are connected to their respective counterparts in play VTR 45 and record VTR 46. These control lines, together with the external synchronization input 54 allow the edit controller to remotely manipulate, synchronize, and control the various elements and devices of the system.

Figure 5:
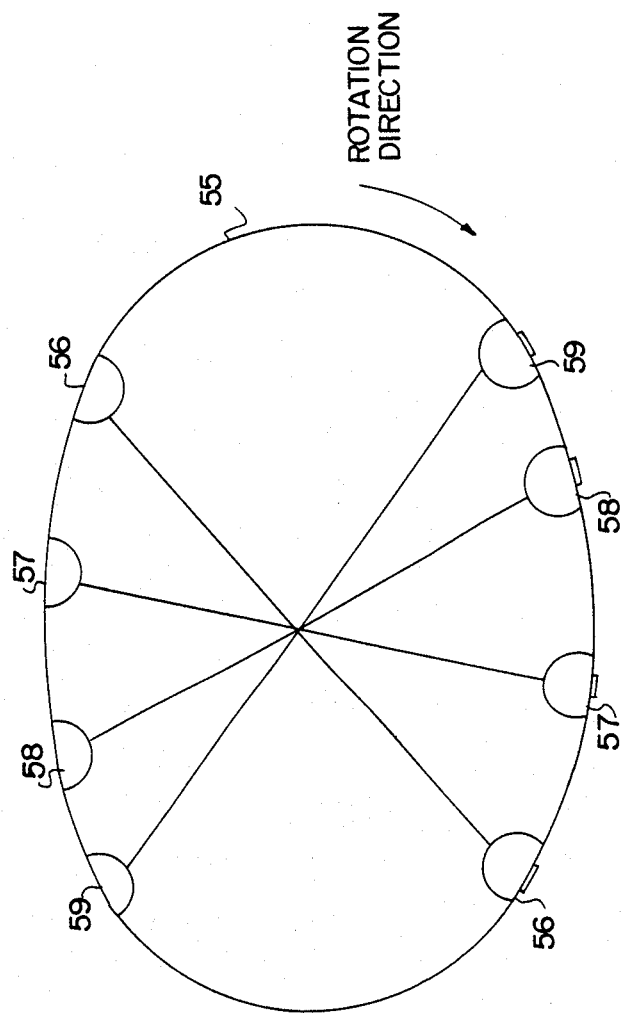
FIG. 5 is a top view of a scanner element used in connection with the embodiment of FIG. 4.

Shown in FIG. 5 is a top view of a scanner element 55 having video heads 56, 57, 58 and 59 mounted thereon. This scanner element is typical of those found in any 180 degree wrap videotape recorder, except for video head 56 which is not found on conventional helical scanners and is added in accordance with the present invention.

We assume here, for the sake of brevity, that the record tape, or tape onto which the new video will be inserted or edited, has been prerecorded with black burst video and a continuous VITC address stream.

However, this is not a necessary condition for operability of the present invention.

A prior art video edit, in which a conventional scanner employing only video heads 57, 58 and 59 is used, is performed as follows. When a segment of video to be recorded onto the record tape by record VTR 46 is presented thereto, record VTR 46 will first erase the video track of the record tape with flying erase head 57. Next the video to be inserted is recorded on the tape by record/playback head 58. Finally, the auto scan tracking or confidence playback head 59 reads the newly recorded video and allows it to be viewed on a monitor as it is being recorded. Since the VITC edit signal is part of the video track, the VITC code of the record tape is erased by the flying erase head 57 before the video insert was recorded. As a result the VITC address of the newly recorded video is not the next continuous address of the record tape, but rather the VITC address of the video insert segment as taken from the play VTR 45. The resultant record tape has, therefore, a non-continuous time code address stream; its first point of non-continuity being that where the video insert was performed.

In an edit system according to the present invention, a segment of video information to be inserted, or video insert, is first identified on play VTR 45. Having identified the segment to be inserted the edit controller can identify and locate the beginning and end of the video insert by reading the associated time code through VITC reader 42 and thereafter remotely instructing play VTR 45 to move to that location. The video insert is thereafter presented to record VTR 46 for insertion.

The additional video head 56 is positioned upstream of the flying erase head 57 in order to continuously read the record tape video tracks before they are erased by erase head 57 during a video edit. The pre-erase video output 60 from video head 56 is demodulated and applied to VITC reader 43, which extracts the time code and forwards it to the intelligent edit controller 41 at its record time code input terminal 48 and to VITC generator 44 at its jam sync input terminal 61. If we refer to the point on the record tape where the new video is to be inserted as address X, then the edit controller will instruct the record VTR 46 to switch to record mode after address X-1 has been achieved, i.e. directly preceding address X. Video head 56 and VITC reader 43 continuously read and simultaneously supply the VITC address on the video tracks of the record tape to edit controller 41 and VITC generator 44 at its jam sync input 61 before the record video tracks are erased by erase head 57. When the record tape reaches the selected record-in point, the edit controller 41 causes record VCR 46 to switch to the record mode from the play mode. The VITC generator 44 continuously inserts the address supplied at the jam sync input 61 into the video signal over the original VITC address of the play videotape. The resulting video insert, therefore, contains the original video information from the play VTR 45 and the continuous record-in address X when it is presented for recording to record VTR 46. After recordation, the record tape now has the new video inserted as well as the original, continuous VITC address stream of the record tape.

As was mentioned earlier, the record tape is assumed to have a VITC address stream recorded thereon at the outset. This can either be actual pre-recorded video information, or the tape can merely have the VITC address stream recorded thereon accompanied by simple black burst video. Alternatively, if no VITC address is supplied on the record tape, the edit controller can easily be manipulated to produce the same results in accordance with the above-described embodiment of the present invention. If the record tape is totally blank, the video edit is placed on the first track of the tape and no pre-erase output is necessary. Assuming the record tape has some information recorded thereon, the pre-erase output of a partially recorded blank tape can be monitored and the last video track having an address then labelled as X. X+1 then becomes the record-in address. The edit controller can add 1 to the pre-erase address X and apply that to the jam sync input of the VITC generator, thereby producing the same result.

Alternatives to the addition of the fourth video head 56 are also possible. As mentioned earlier, conventional helical scanners in VTR's have a confidence playback head downstream of the record/reproduce head. This head is used to view the video as it is being recorded. Additionally, auto scan tracking, AST, is a means by which the confidence playback head can be used to continually scan the same video track for still motion viewing. AST is well known in the art and most conventional VTR's have this feature.

To provide an edit system in accordance with the present invention without adding a further video head, first, the confidence playback head may be repositioned to reside upstream of the flying erase head and could function in the same manner as additional video head 56 in the above-described embodiment. This would, of course, eliminate confidence playback capability.

Figure 6A:
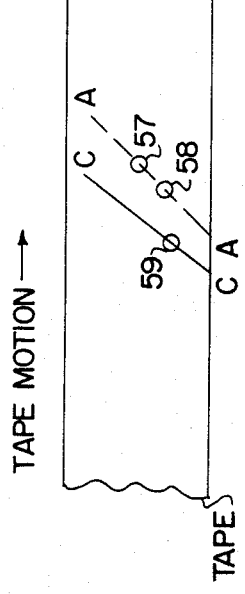
Figure 6B:
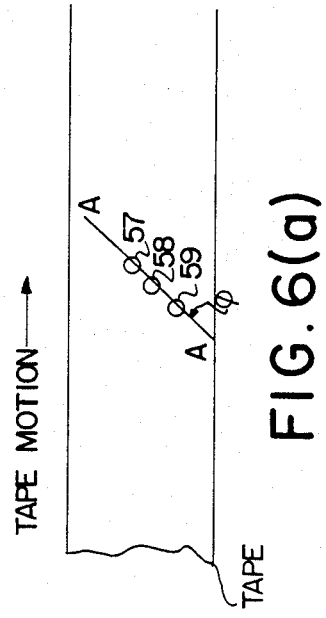
Figure 6B:
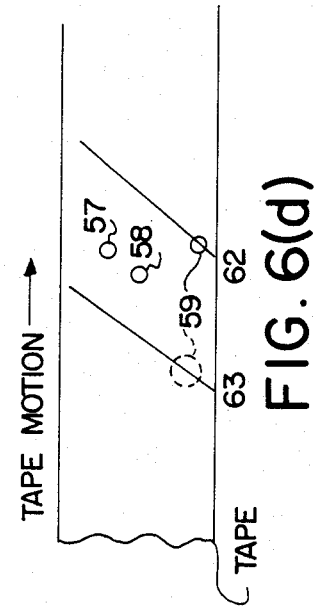

Alternatively, the AST mechanism can be modified. Ordinarily, the confidence playback or AST head 59 is positioned so that it reads the video track after the recordation of the video has been accomplished by the record head 58 since it is in approximate alignment with record head 58 and erase head 57. With reference to FIG. 6(a), the tape path A→A across the scanner heads 57, 58 and 59 is straight in such a normal playback mode, and is traced at the given normal playback angle $\theta$. However, when in still frame mode the AST mechanism operates to effectively change the angle of its AST head relative to the path taken during regular playback, thereby allowing the AST head to continually scan the same video track. During still frame mode the tape traces a path B→B at an angle $\theta$ which is different than the normal playback angle $\theta$, as shown in FIG. 6(b). The confidence or AST head 59 is accordingly bent down across the path of the tape by utilizing a biased piezoelectric element. By reversing the polarity across the element, the AST head 5 can be deformed in the opposite direction, i.e. in such a manner that it bends upwards towards the top of the scanner. The tape path C→C of FIG. 6(c) shows the tape path across the AST head in accordance with this bias effect relative to the flying erase head 57 and record head 58, in order that the now biased AST head 59 scans the track first. The biased AST head 59 now takes the place of the fourth pre-erase head 56 of the previous embodiment, and editing can be accomplished as aforedescribed.

Figure 6D:
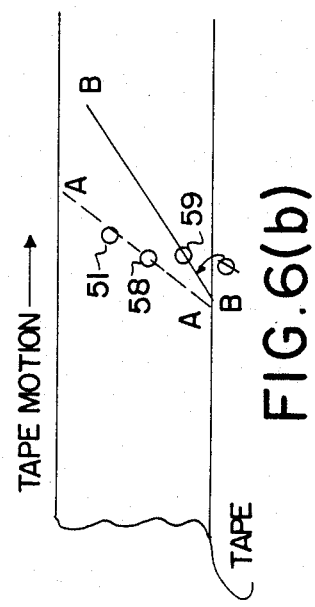

It should be noted that it would not be possible to simply modify existing AST mechanisms to achieve such a function by merely changing the bias voltage of the AST head. This is so because, although the AST head scans the same track as the record/reproduce head in normal recording operation, when in still frame mode the AST head 59 is bent up and down in such a manner that it scans one track 62 (field #1) during its first pass and the adjacent track 63 (field #2) during its next pass, continuing alternatively thereafter, as shown in FIG. 6(d). It would therefore become necessary to initialize the AST head so as to detect when it is scanning the desired track.

Figure 7:
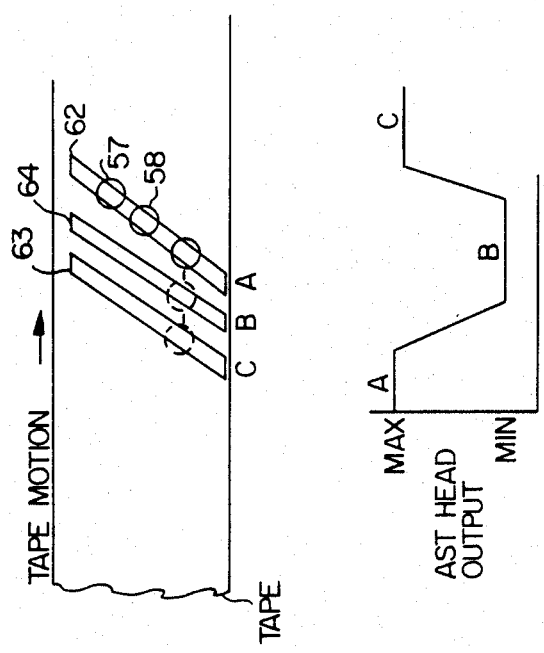
FIG. 7 is a diagram of the initialization position of an auto scan tracking video head used in accordance with the invention of FIG. 4 and shown in FIG. 6.

This can be accomplished by aligning the AST head 59 with the record/reproduce head 58 as shown in FIG. 7 in bold line, which would initialize the AST head to the position of the track being erased. To verify correct initialization of the AST head, the bias, and therefore the position, of the head can be varied until its output is equal to the record/ reproduce head, compensating, of course for the small physical separation of the aligned heads. Once initialized, the AST head can be moved in the direction of the desired track by applying the necessary bias voltage. By monitoring the output amplitude of the AST head 59, it can be determined when the desired track is identified. The amplitude of the AST head 59 will start at a maximum value at initialization since it is aligned with the record/reproduce head, shown at position A. As the AST head bias voltage is applied and the head moves, the amplitude of the output will decrease until it reaches a minimum indicating it has moved away from the initialization track and is now scanning the guard band 64 between tracks, indicated by position B. The output of the AST head 59 will reach a second maximum when it is centered on the next track, indicated a portion C, which is, of course, the desired track. The VITC generator is therefore preset with the correct address.

Figure 8:
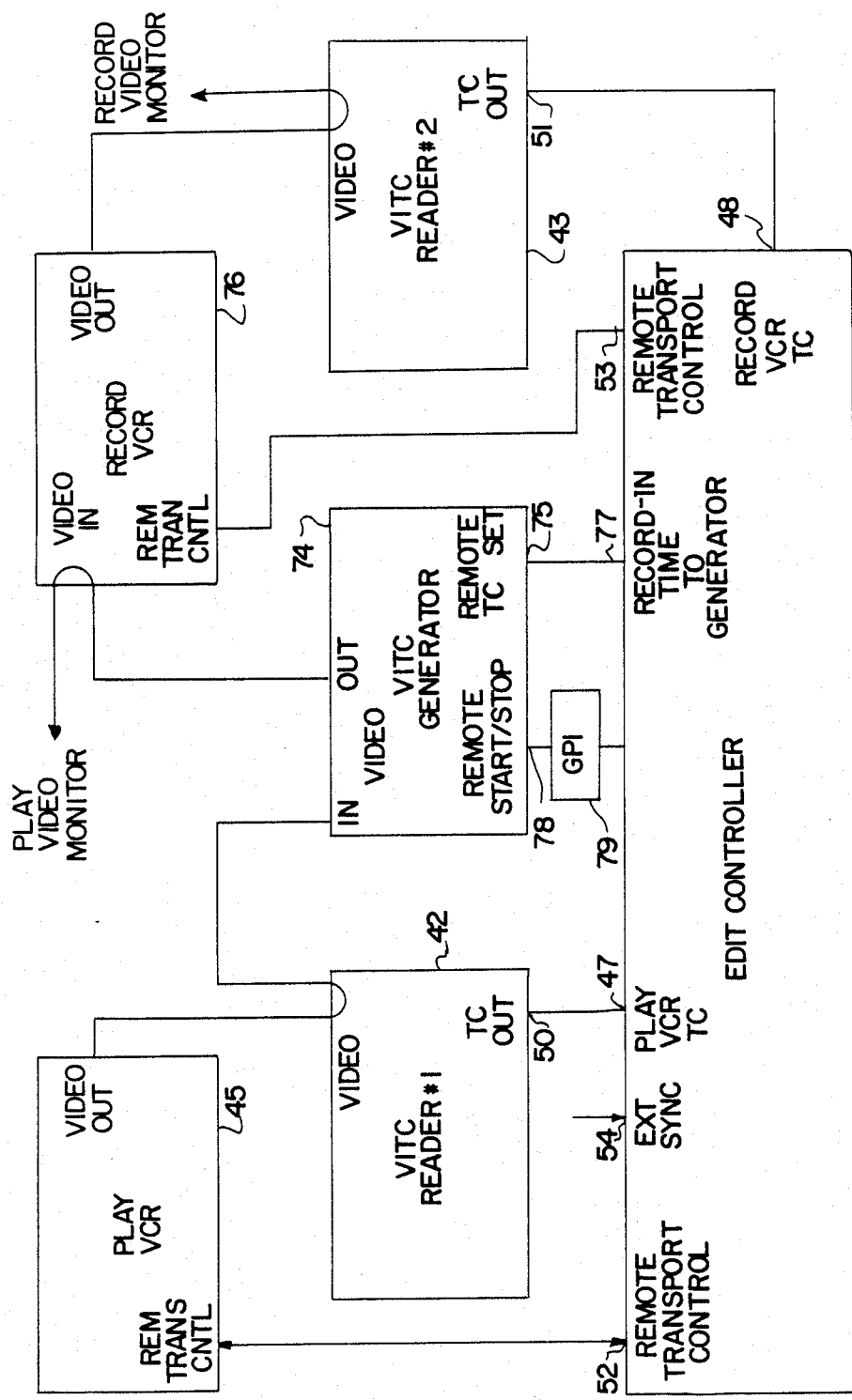
FIG. 8 is a block diagram of an alternative embodiment of the present invention.

With reference to FIG. 8 there is shown an alternative embodiment of the present invention employing a modification of the VITC generator as opposed to the VTR modifications described in the previous embodiment. It is assumed that the VTR's referred to in the present embodiment are conventional VTR's not having the aforementioned modifications.

The editing system shown in FIG. 8 includes edit controller 41, VITC readers 42 and 43, VITC generator 74, play VTR 45 and record VTR 76. The time code input terminals 47 and 48 of edit controller 41 are connected respectively to VITC readers 42 and 43, as in the previous embodiment. The respective remote transport control terminals are also connected as before. VITC generator 74 is displaced upstream of the video input of the record VTR 76. Additionally, VITC generator 74 has a remote time code set terminal 75 operatively connected to a time code output terminal 77 of edit controller 41, and a remote start/stop switch 78 activated by a logic control signal from the edit controller 41 through general purpose interface or GPI 79.

GPI's are known in the art and are used primarily for special effects machines. Conventional VITC generator are not adapted to respond to a GPI or to be started at the exact time the record VTR 76 begins to scan tracks during a video edit. The remote start/stop logic line 78 and the generator time code set terminal 75 overcome these deficiencies and allow the VITC generator 74 to respond to a logic control signal at the precise time initiated by the edit controller 41

In accordance with the present embodiment, the record-in time, or the time code address of the record tape at the point of insertion of the video edit material, is determined by the operator. This can be done in any number of ways; for example, by reviewing the record video tape until the edit point is found and having VITC reader 43 supply the time code to the edit controller 41. The edit controller can be programmed to calculate the necessary time code address, for example by adding one to the previously read address. Or the operator can simply enter the record-in time code address directly into the edit controller.

Once the record-in time code address is known it is digitally supplied to the VITC generator 74 through terminal 77 of the edit controller 41. This VITC address is pre-set into the VITC generator by way of time code set terminal 75, which may store the address in a register, for instance.

During the synchronization process, edit controller 41 will preset VITC generator 74 with the proper time code address, then initiate the recording process. The GPI 79 acts to delay activation of the VITC generator 74 until the precise moment when the record VTR 76 begins to scan the first field of the frame. Synchronization is accomplished by conventional methods employing edit controllers and GPI's. The edit controller 41 will therefore issue a command signal to the GPI 79 at the proper time in order to insert the VITC address preset in the VITC generator 74 into the video signal to be recorded.

It should be noted that the edit controller 41 may control the remote start/stop terminal of the VITC generator independently of the GPI, and that the address of any subsequent frames could be supplied by having either the edit controller or the VITC generator increment the initial preset address.

Figure 9:
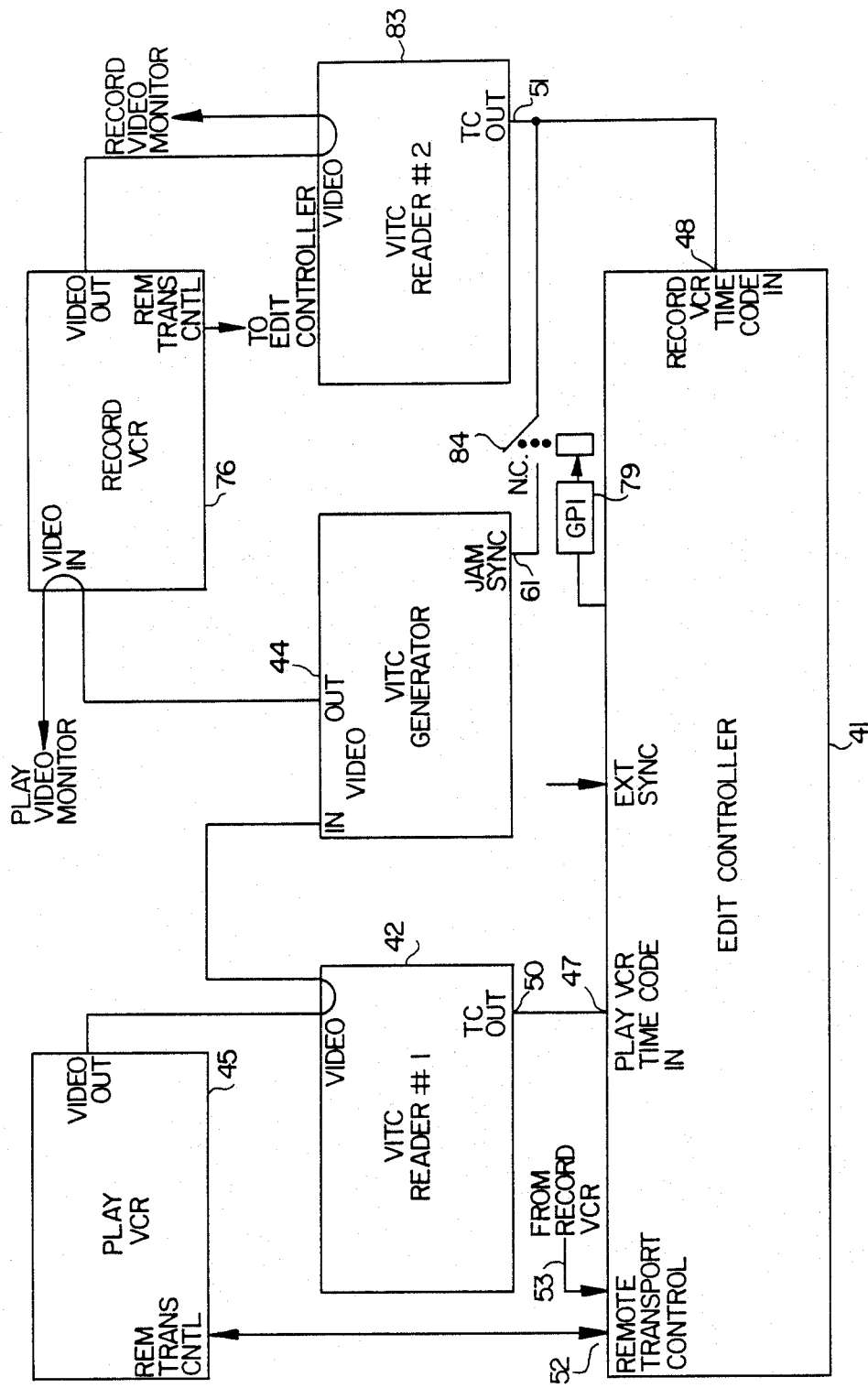
FIG. 9 is a block diagram of a third embodiment of the present invention.

Referring now to FIG. 9 there is shown a third embodiment of the invention whereby a modification of a VITC reader is disclosed. This third embodiment allows an edit to be performed without any of the previously mentioned modifications.

The editing system in accordance with the instant embodiment includes edit controller 41, VITC readers 42 and 83, VITC generator 44, play VTR 45 and record VTR 76. The remote transport control, external sync signals and VITC readers to edit controller connections are supplied in the instant embodiment in the same manner as the previous embodiment.

In the editing process, the edit controller 41 performs what is termed pre-roll, which is actually the time when the edit controller 41 aligns the play VTR 45 and record VTR 76. This is accomplished via remote transport control lines 52 and 53, respectively. During pre-roll time the edit controller adjusts for slight variations in the relative tape speed of each machine. Pre-roll insures that the play VTR is outputting the desired video insert at the precise time the insertion point on the record VTR is achieved, thereby insuring a proper edit.

During pre-roll the video output from the record VTR is the record VTR's pre-recorded video. This output is switched to the play VTR's video output at the record-in time. Once the record-in time has been established, VITC reader 83 can take advantage of pre-roll time to insure that the correct continuous VITC address of the record VTR's prerecorded video is maintained.

VITC reader 83 is in operative engagement with VITC generator 44 by way of switching device 84. The time code output of VITC reader 83 is supplied to the jam sync input 61 of VITC generator 44 through switching device 84. As previously mentioned the VITC generator 44 will insert the address present at its jam sync input into the play VTR's video output.

During pre-roll, as discussed above, VITC reader 83 reads the time-code address of the pre-recorded video from record VTR 76. The edit controller 41, which controls the operation of switching device 84 through GPI 79, operates to keep the device in the closed position during pre-roll. During this time the jam sync input 61 of VITC generator 44 is being supplied with the VITC address of the pre-recorded video from the record VTR 76 via VITC reader 83. However, record VCR 76 is not operative to insert these addresses since it has not yet been instructed to perform the edit by controller 41. Once the record-in time is approached, i.e. the address of the last video track before which insertion is to performed is read, the edit controller 41 operates to open switch device 84 thereby inhibiting the address input to the jam sync input 61 of VITC generator 44. The edit controller then instructs the system to perform the edit. Since VITC generator 44 is located upstream of record VTR 76, the VITC generator inserts the address input at its jam sync terminal 61 into the play VTR's video and the time code on the first video frame supplied to the record VTR 76 is the same as the time code on the record videotape prior to erasure. The VITC generator is instructed to successively increment the address starting from the last address input at the jam sync terminal 61, for the duration of the video insert.

While the above-described embodiments can be used generally in any 180 degree wrap tape system, they are especially well suited for ¾ inch E format broadcast systems. And while they are equally applicable to 1 inch C-format systems, another embodiment of the present invention for C-format systems is provided herein. It should also be noted that certain parameters of 1-inch C format systems may require slight modification in the aforementioned embodiments of the invention. For instance, in a 1-inch C format system the direction of tape motion is usually opposite to that in ¾ inch systems. Accordingly, the aforementioned description of the modification of the AST head would be correct in all respects except the bias voltage would be applied such that the head would bend in a direction opposite to that taken in a three quarter inch system, a mere mechanical adaptation particular to the one-inch operating parameters but in no way associated with the inventive method applied thereto.

Figure 10:
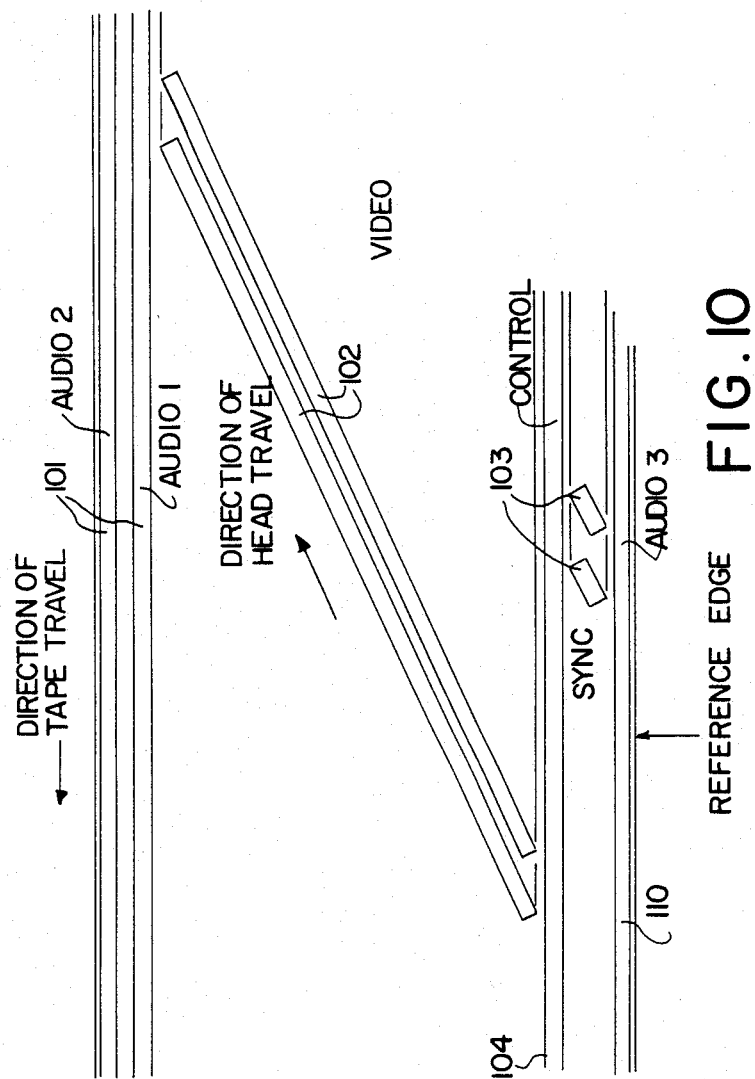
FIG. 10 is a diagram of the location of recorded information on a one-inch C-format broadcast type videotape.

With reference to FIG. 10 there is shown the ANSI C98 19M-1979 specification for the location of recorded information on 1 inch C-format video tape. Provided thereon are first and second audio tracks 101, third audio track 110, video tracks 102, sync tracks 103, and control track 104. Unique video information is encoded on the long diagonal tracks 102. The sync tracks 103 represent a ten line segment of the vertical interval.

Figure 11:
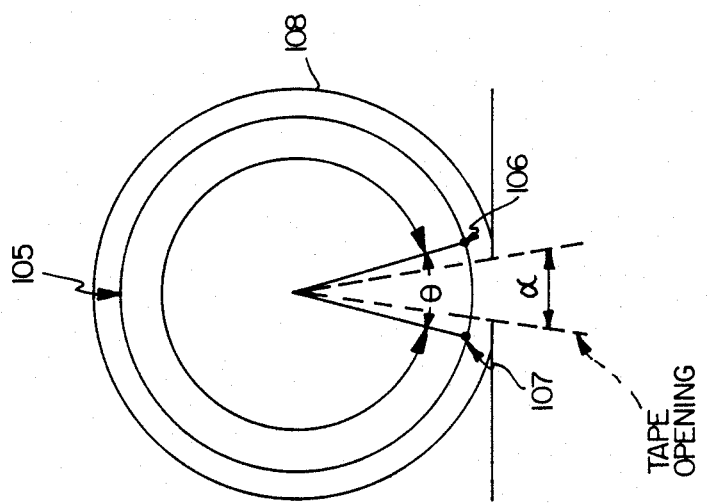
FIG. 11 is a top view of the scanner-tape configuration in a C-format system.

Shown in FIG. 11 is a top view of the scanner-tape configuration in a C-format system. Scanner 105 is provided with two heads, video head 106, and sync head 107. Videotape 108 is wrapped around the scanner so as to resemble the Greek letter omega ($\Omega$), therefore, the name omega wrap is given to this type of configuration. As can be seen, video head 106 and sync head 107 are separated by the angle $\theta = 30°$ while the tape opening of the omega wrap is given by the angle $\alpha = 14°$. This insures that at least one of the heads 106 or 107 are in contact with the tape at all times.

With reference to FIGS. 10 and 11, the video head 106 begins scanning each field at the lower left end of a video track 102 and ends at the upper right portion of that track. The video head 106 then loses contact with the tape and circles around to the lower half of the tape to begin scanning the next track. The video head 106 thus loses contact with the tape during lines 5–14 of the vertical time period. During this period the sync head 107 is in contact with the sync track 103. Since conventional edit systems use the third audio track 110 to record the LTC they do not read any information from sync tracks 103 because it is unnecessary. This use of the incomplete waveform is termed format drop-out and, currently, the sync track is not used and edit equipment manufactured with current standards does not provide any specification to do so.

In accordance with the present invention the VITC address must be constrained to lines 5–14 and is recorded on the ten line segment of the vertical interval located on the sync tracks 103. This effectively creates a dedicated time code track for the VITC code. To insure that the VITC code signal waveform does not appear as interference in the active picture used during retrace, it is further constrained to lines 10–14 of the vertical interval. This vertical interval can be continuously read in slow or still motion since the sync head is mounted on the scanner and will repeatedly be capable of reading the dedicated sync track.

With such a system it is easily seen that the VITC code can be added to a blank record tape before any editing has taken place. Thereafter, video and audio inserts can be made and the live program added to the tape without regard to proper insertion of the VITC code by a VITC generator. Once recorded the VITC on the sync track 103 is never erased by the video head 106 because it is not brought in contact therewith. Similarly, VITC can be added to material already recorded since insertion of the VITC code by sync head 107 is independent of the video information. In either case, however, there is a requirement to provide switching capabilities to route the desired signal to the head that is in contact with the tape at the proper time.

The head switching on playback takes place during lines 3 and 16 of the vertical interval. At line 3 the switching of the heads is from video to sync and at line 16 it is from sync to video. At these points the sync and video heads are recording the same information, i.e. the video head records until at least line 4 before losing contact with the tape while the sync head has made contact by at least line 2. Similarly, the video head again makes contact with the tape at line 15 but the sync head loses contact at line 17. During these periods, since both heads are recording the same information, the transition between the heads is transparent at the output monitoring point. After line 17, the sync head must be turned off so that it does not disrupt the recordation by the video head.

Figure 13:
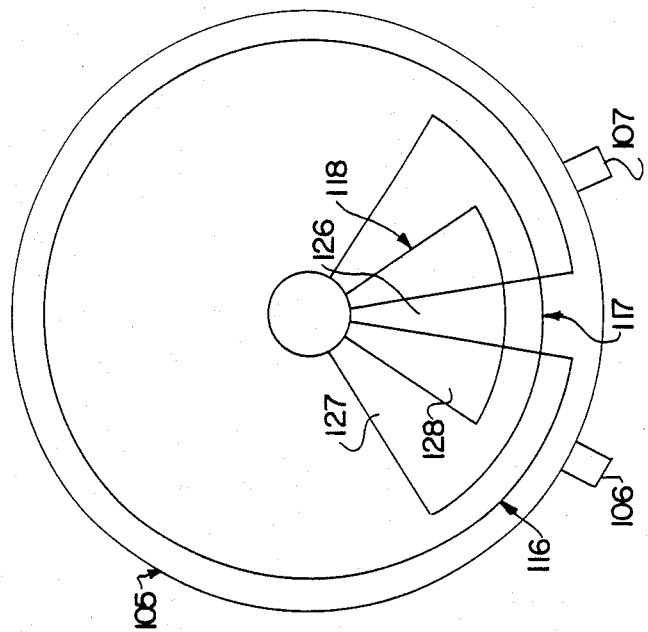
FIG. 13 is a bottom view of the scanner of FIG. 12.
Figure 12:
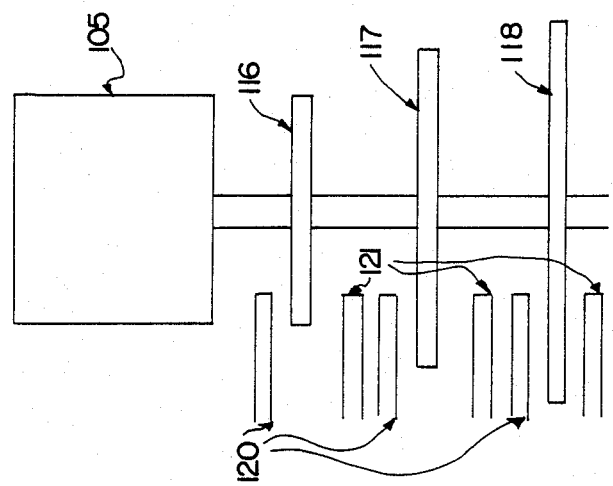
FIG. 12 is a side elevational view of a scanner used in the embodiment of FIG. 18.

To accomplish this head switching a system of three circular opaque plates are attached to the scanner 105 as shown in FIG. 12. Provided thereon are video head plate 116, sync head plate 117, and playback plate 118, shown here with varying, increasing diameters. A light source 120 is placed on one side of each plate and a photo cell 121 is placed on the other side as shown. With reference to FIG. 13, video head plate 116, sync head plate 117, and playback plate 118 are provided with respective cut-out portions 126, 127 and 128, aligned as shown. The incoming video signal is applied to two solid state switches 122 and 123, of FIG. 14 which are placed in line in both the video head and sync head signal paths, and which are controlled by the output of the photo cell 121.

Figure 14:
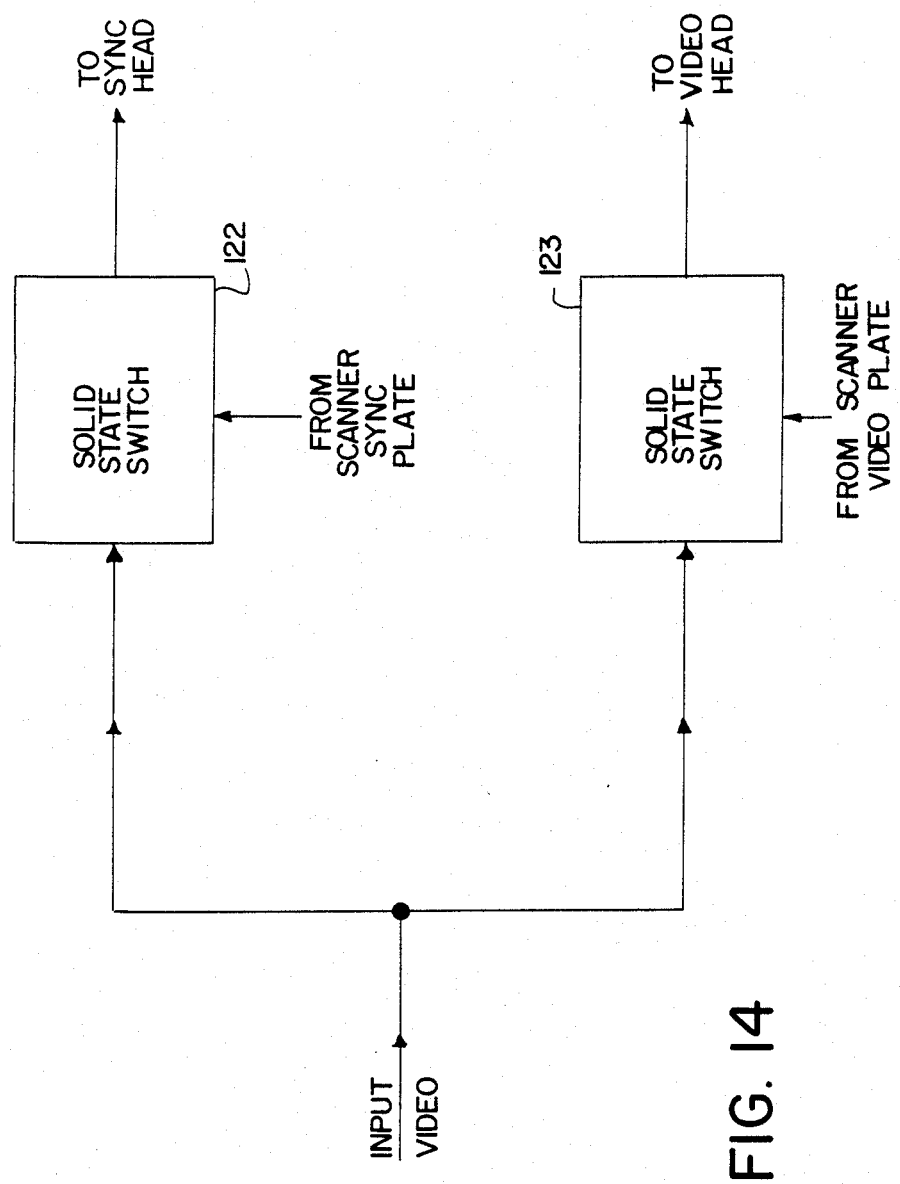
FIG. 14 is a functional diagram of a switch element used in conjunction with the scanner of FIG. 12.

Since the plates 116, 117 and 118 are mechanically tied to the scanner 105, the light source for each plate can be seen by the photocell during the period when the cut-out is passing thereby. When the photo cell for the applicable head is activated, the video signal is inhibited from reaching that head by the solid state switch, as shown in FIG. 14.

Figure 15:
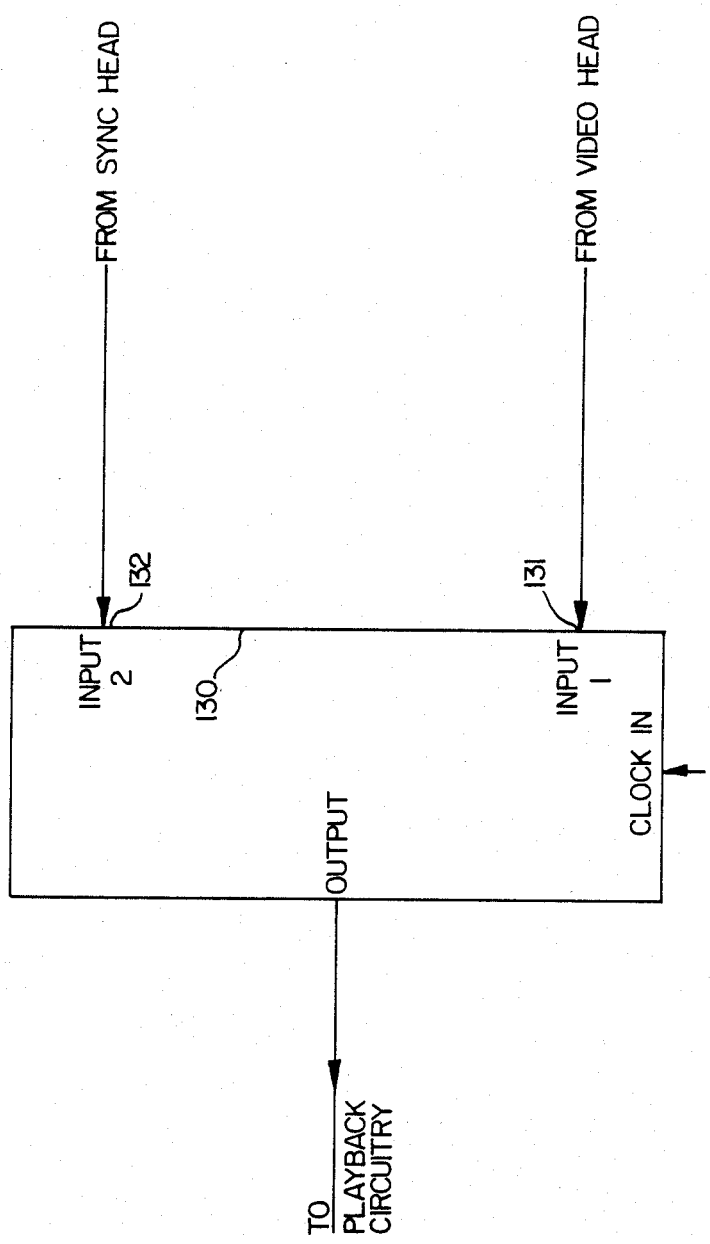
FIG. 15 is a functional diagram of a multiplexer element used in the embodiment of FIG. 18.

For playback, the photo cell output of the playback plate is used as a clock input of a 2 to 1 multiplexer 130, shown in FIG. 15. With the video head and sync head information as the two inputs 131 and 132 to the multiplexer, they are combined into one continuous signal for playback.

Figure 16:
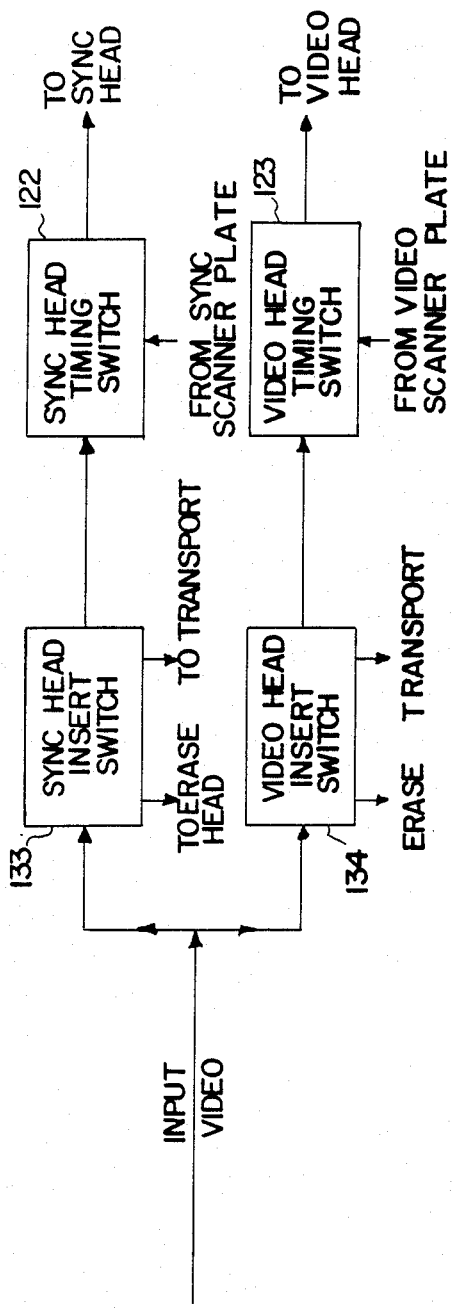
FIG. 16 is a functional diagram of switching means employed to allow video and sync inserts independently of each other in the embodiment of FIG. 18.
Figure 17:
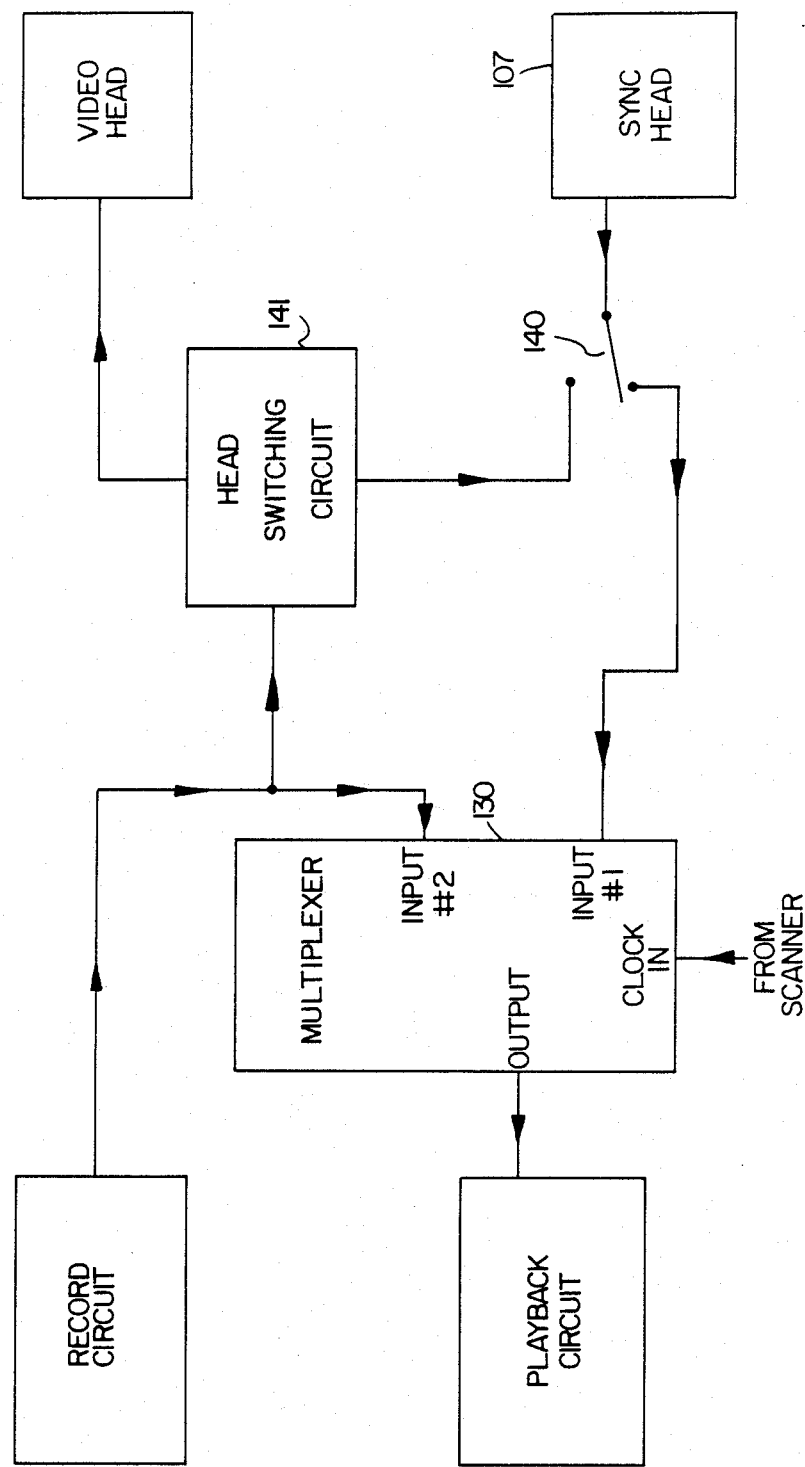
FIG. 17 is a diagram of a signal chain in accordance with the embodiment of FIG. 18.

To provide the capability of performing video and sync inserts independently of one another, a switching network employing two switches 133 and 134 are provided upstream of the switches 122 and 123 for head switching as shown in FIG. 16. These switches may be controlled by a manual toggle switch and are installed just ahead of the slip rings on the scanner. Alternatively, they may be controlled by a logic signal from a semiconductor device, e.g. an or gate. The video signal is applied to the head for the edit mode chosen, sync or video, and is effectively inhibited from being passed to the other by opening the switch to that head. In order to read the VITC code from the sync track while recording new information on its video track, modification must be made to a conventional VTR since they are not now capable of performing both functions simultaneously. With reference to FIG. 17 there is shown a signal chain whereby the playback circuit is reading the VITC code from snyc head 107 through switch 140 while the video head is supplied with the input video for recordation. The head switching circuit 141 and multiplexer 130 operate in the same manner as described above.

Figure 18:
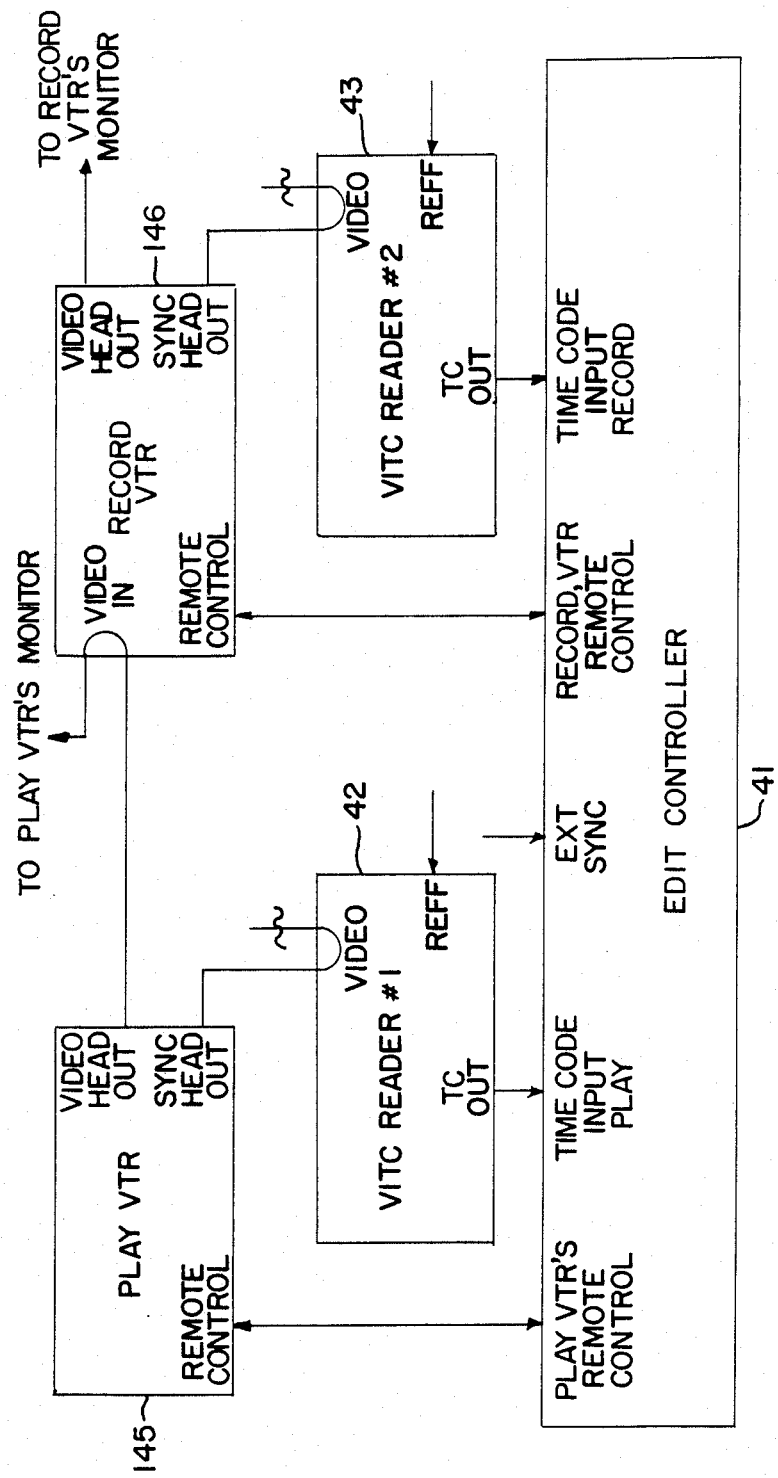
FIG. 18 is a block diagram of a fourth embodiment of the present invention.

With reference to FIG. 18, a block diagram of the above-described editing system for 1 inch C-format is shown. The system requires only an edit controller 41, VITC readers 42 and 43, and play VTR 145 and record TR 146. It is not necessary in this embodiment to have a VITC generator. The edit controller 41 can assume functional control of the editing process by receiving the time codes directly since it does not have to supply the proper code to a VITC generator for insertion into the video signal upstream of the record VTR's 146 video input terminal.

Another important advantage is realized by the present invention relating to the addition of a second audio program (SAP) channel specified in multichannel television sound formats. Since the present invention achieves functional editing without the need for a dedicated longitudinal track, the audio track previously used for recordation of the time code signal is now free and may be used for a translation of the program into a second language.

The detailed description of the preferred embodiment of the invention having been set forth herein for the purpose of explaining the principles thereof, it is known that there may be modification, variation or change in the invention without departing from the proper scope of the invention and the claims thereto.

I claim:

1. A video editing system for editing a first video signal having first vertical time code addresses recorded thereon, onto a storage means having a second video signal recorded thereon and capable of being erased therefrom with second vertical time code addresses in respective vertical blanking periods thereof; comprising:

means for supplying said first video signal;
  recording means for recording selected segments of said first video signal on said storage means;
  first reading means for reading said first vertical time code addresses from said first video signal;
  second reading means for reading said second vertical time code addresses from said second video signal, and for operatively supplying selected second vertical time code addresses to an inserting means;
  control means having inputs for reading said first and second time code addresses from said first and second reading means, respectively, wherein said control means includes means for selecting segments of said first video signal to be recorded on said storage means; for selecting edit points on said storage means, based on said second vertical time code addresses, for recording said selected segments; and for remotely controlling said first video signal supply means and said recording means; and
  inserting means between said supply means and said recording means for inserting said second vertical time code addresses of said edit points respectively into vertical blanking periods of said selected segments of said first video signal before said segments are recorded at said edit points of said second video signal by said recording means.

2. A video editing system according to claim 1, wherein said inserting means includes memory means for storing the address of a first selected edit point received from said second reading means, and said inserting means further includes means for inserting the address of the first selected edit point into the vertical blanking period of a first of said selected number of segments, and thereafter for incrementing said address by a constant and inserting said incremented addresses into successive vertical blanking periods of the segments of said first video signal to be recorded after said first one of said segments.

3. A video editing system according to claim 1, wherein said storage means is a video tape and said recording means is a videotape recorder having record and erase video heads respectively displaced along the perimeter of a head scanner for erasing that portion of the videotape onto which said segments of said first video signal are to be recorded and thereafter recording said segments,
  said scanner including a pre-erase video head displaced upstream of the eras head in such a manner so as to read said second video signal on said portion of said videotape before said signal is erased by said erase head, and supply said second video signal to said second reading means.

4. A video editing system according to claim 1, wherein said storage means is a video tape and said recording means is a videotape recorder having erase, record and playback video heads respectively displaced along the perimeter of a head scanner for erasing that portion of the videotape onto which said segments of said first video signal are to be recorded, and thereafter recording said segments,
  said playback video head being mounted so as to exhibit a piezoelectric deformation in response to an applied bias for reading said second video signal on said portion of said videotape before said second video signal is erased by said erase head and supplying said second video signal to said second reading means.

5. A video editing system according to claim 1, further comprising switching means provided between said second reading means and said inserting means for supplying, under command of said control means, the address of a first of said plurality of edit points to said inserting means for inserting into the vertical blanking period of a first of said selected number of segments, and said system further includes means for thereafter incrementing the address of said first of the plurality of edit points by a constant and for insertion into successive vertical blanking periods of the segments of said first video signal to be recorded after said first one of said segments.

6. A video editing system according to claim 5, wherein said storage means is a videotape.

7. A video editing system according to claims 3, 4 or 5, wherein said second reading means is a VITC reader, and said inserting means is a VITC generator having a jam sync input for receiving said supplied addresses from said VITC reader.

8. A video editing system according to claim 7, wherein said first time code addresses of said first video signal are vertical time code addresses recorded on respective vertical blanking periods thereof, said supply means is a videotape recorder and said first reading means is a VITC reader.

9. A video editing system according to claim 2, wherein said inserting means is a VITC generator having a register as memory means, and said storage means is a videotape.

10. A video editing system according to claim 3, 4, 6, or 9, wherein said storage means is a three-quarter inch E format broadcast-type videotape.

11. A video editing system for editing a first video signal having first vertical time code addresses recorded thereon onto a videotape having a second video signal recorded thereon with second vertical time code addresses in respective vertical blanking periods thereof, wherein said videotape has a first track containing said second vertical time code addresses and a second track, separate from the first track, containing portions of said second video signal other than said vertical time code addresses, comprising:
means for supplying said first video signal; videotape recording means for recording selective segments of said first video signal on said videotape, wherein said videotape recording means includes play and sync video heads respectively displaced on the perimeter of a head scanner in such a manner so that one head is in contact with said videotape at all times;
first reading means for reading said first vertical time code addresses from said first video signal,
second reading means for reading said second vertical time code addresses from said second video signal;
control means having inputs for reading said first and second time code addresses from said first and second reading means, respectively, wherein said control means includes means for selecting segments of said first video signal to be recorded on said videotape; for selecting edit points on said storage means, based on said second vertical time code addresses, for recording said selected segments; and for remotely controlling said first video signal supply means and said recording means; and
switching means responsive to the position of said play and sync video heads for engaging said play video head to read said second track of said videotape and said sync head to read said first track of said videotape only at selected positions.

12. A video editing system according to claim 11, wherein said head scanner has play and sync plates mounted thereon for rotating with said head scanner, each of said plates being mounted on said scanner between a light source and a photocell, said plates having respective cut-out portions for passing light from said light source to said photocell, and wherein said switching means is responsive to said photocell.

13. A video editing system according to claim 11, wherein said videotape recording means further includes multiplexing means for combining the portions of said video signal read by said play and sync video heads and supplying said combined portions to a playback video circuit.

14. A video editing system according to claim 11 or 12, wherein said videotape recording means includes second switching means for allowing said video signal to be recorded on said second track of said videotape by said record head while said first track of said videotape is read by said sync head.

15. A video editing system according to claim 11 or 12, wherein said videotape is a one inch C-format broadcast type.

16. A video editing system according to claim 3, 4, 6, or 11, wherein said videotape contains a first language translation of said recorded video signal on first or second longitudinal audio tracks and a second language translation on a third longitudinal audio track.

17. A video editing system according to claim 9 or 11, wherein said first time code addresses of said first video signal are vertical time code addresses recorded on respective vertical blanking periods thereof, said supply means is a videotape recorder and said first reading means is a VITC reader.

18. A method for performing a video edit comprising:
supplying a first video signal having first vertical time code addresses recorded thereon,
selecting a number of segments of said first video signal as a video edit,
supplying said selected segments to recording means for recording on storage means at a plurality of edit points of a second video signal recorded thereon with second vertical time code addresses in respective vertical blanking periods thereof,
reading said first time code addresses from said first video signal and said second time code addresses from said second video signal,
forwarding said first and second time code addresses to control means, and forwarding a selected number of said second vertical time code addresses of said plurality of edit points to inserting means,
inserting said second vertical time code addresses of said plurality of edit points respectively into vertical blanking periods of said selected segments of said first video signal before said segments are supplied to said recording means, and
remotely controlling said recording means by said control means for recordation of said selected number of segments.

* * * * *